Oct. 9, 1951  C. H. WATKINS  2,570,615
METHOD OF REMOVING CARBON MONOXIDE FROM HYDROCARBONS
Filed April 19, 1947
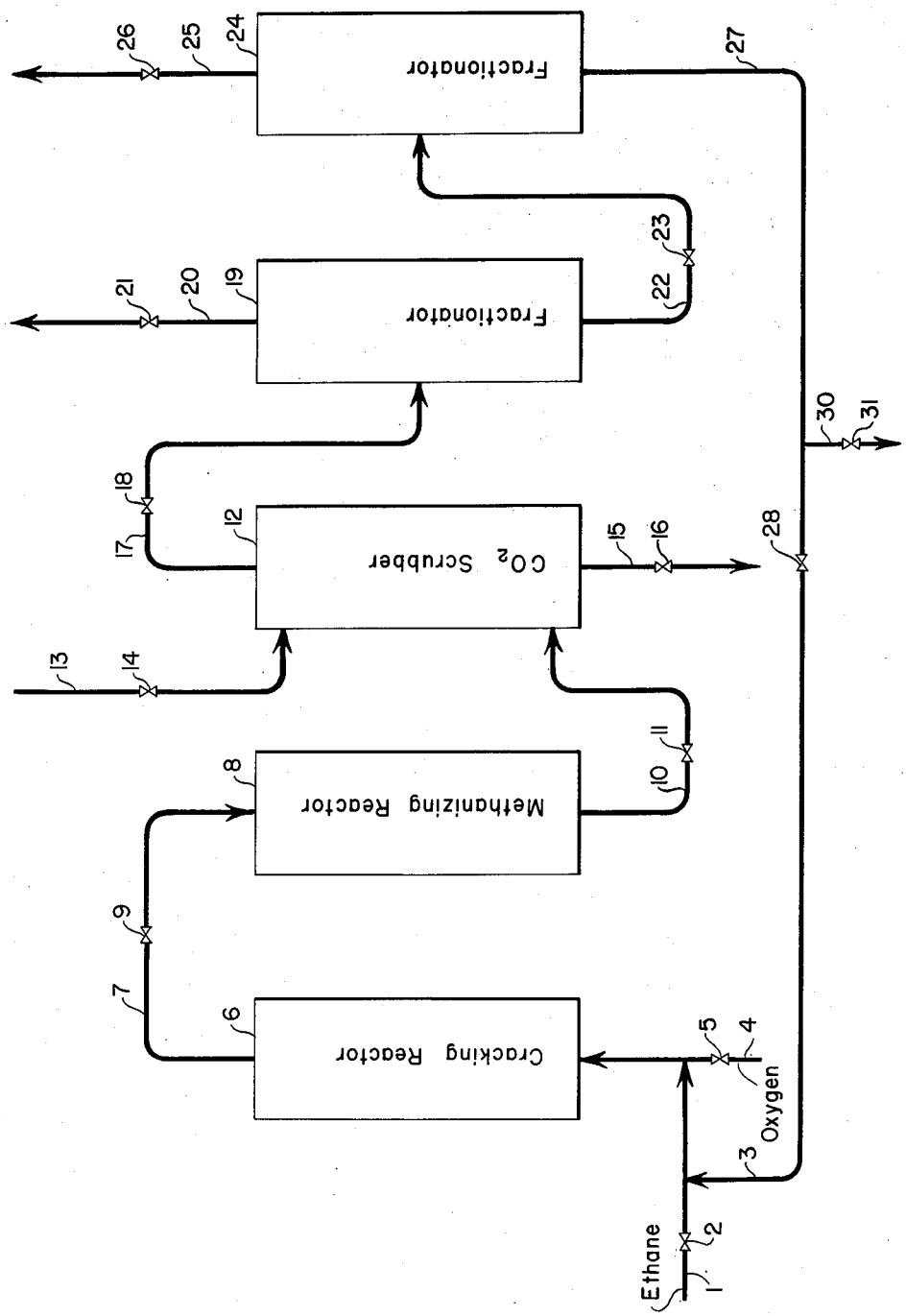
Inventor:
Charles H. Watkins
Maynard P. Venema
Attorney Patented Oct. 9, 1951

2,570,615

UNITED STATES PATENT OFFICE 2,570,615

METHOD OF REMOVING CARBON MONOXIDE FROM HYDROCARBONS

Charles H. Watkins, Brookfield, Ill., assignor to Universal Oil Products Company, Chicago, Ill., a corporation of Delaware Application April 19, 1947, Serial No. 742,753

6 Claims. (Cl. 260—677)

This invention relates to a method of separating carbon monoxide from hydrocarbons. It is more particularly concerned with the removal of carbon monoxide from hydrocarbon mixtures containing olefins by a method involving selective catalytic hydrogenation of the carbon monoxide.

In certain hydrocarbon conversion processes, the products contain carbon monoxide, which often must be removed therefrom before the desired products can be utilized. For example, in the oxidative cracking of hydrocarbons to produce gaseous olefins, the hydrocarbon products are contaminated chiefly with water vapor, carbon dioxide, hydrogen, and carbon monoxide. The first two contaminants can be separated rather easily from the cracking zone effluent, but the hydrogen, and particularly the carbon monoxide, are more difficult to remove. I have invented a simple and effective method of accomplishing their removal.

In one embodiment my invention relates to a process which comprises contacting a mixture containing carbon monoxide, hydrogen, and hydrocarbons with a relatively inactive reduced iron oxide catalyst at a temperature from about 500° F. to about 900° F., and a pressure such that a substantial proportion of the reactants are in the vapor phase.

In a more specific embodiment my invention relates to a process for preparing a hydrocarbon fraction relatively free from carbon monoxide which comprises contacting a mixture comprising carbon monoxide, hydrogen, and hydrocarbons, including olefins, at a temperature of from about 500° F. to about 900° F., a gas hourly space velocity of from about 10 to about 1000, based on the hydrogen plus the carbon monoxide, and a pressure such that a substantial proportion of the reactants are in the vapor phase, with a catalyst prepared by reducing iron oxide at a temperature of from about 800° F. to about 1200° F.

Briefly stated, my invention relates to the removal of carbon monoxide from hydrocarbons, particularly olefinic hydrocarbons, by a process which comprises subjecting the carbon monoxide-containing hydrocarbons, together with hydrogen, to the action of a particular type of catalyst at conditions that promote the selective hydrogenation of carbon monoxide to methane. The carbon monoxide-free hydrocarbons can then be used as such or the methane may be removed therefrom by simple distillation, absorption, or the like. Thus it can be seen that one of the essential features of my invention is the catalyst, which much be selective for the hydrogenation of carbon monoxide to methane, but at the same time must be substantially devoid of activity for the hydrogenation of olefins at the operating conditions employed. Catalysts that possess these properties are reduced iron oxides that have been reduced at a temperature of from about 800° F. to about 1200° F. If the iron oxides are reduced at temperatures much below 800° F., the resultant material is too active and promotes the hydrogenation of olefins as well as carbon monoxide. On the other hand, the material produced by reducing iron oxide at temperatures above about 1200° F. usually possess little activity of any sort due chiefly to sintering. Inexpensive materials that are readily convertible to methanizing catalysts, which is the term I use for catalysts that are utilizable in my process, comprise minerals or ores that consist predominantly of oxides of iron. Such minerals include hematite, specular hematite, limonite, goethite, martite, and magnetite. The presence of 0.1% to 2.0% of potassa enhances the catalyst life.

Other features and advantages of this process will be apparent from the following detailed description of the attached flow diagram which illustrates one method of conducting the process of the present invention. In this illustration, the step of removing carbon monoxide from a mixture with hydrocarbons is shown in conjunction with an oxidative cracking operation.

Referring now to the drawing, a stream of fresh ethane is passed through line 1 containing valve 2 and is joined by a stream of recycle ethane, prepared in the manner hereafter described, said recycle stream entering line 1 by means of line 3. The combined stream of ethane is preheated and vaporized by means not shown in the drawing to a suitable temperature, which is usually within the range of 800 to 1400° F. The vaporized ethane then passes into line 4 where it joins a stream of preheated oxygen flowing through line 4 containing valve 5. The oxygen usually is preheated to a temperature that is of the same order of magnitude as the temperature of the ethane. The amount of oxygen usually is from about 10 to about 40 weight per cent of the hydrocarbon. If less than this amount of oxygen is used, the extent of the reaction is too limited; if more than this amount is used, the efficiency of the cracking reaction decreases and relatively large amounts of carbon oxides are formed.

The mixture of ethane and oxygen is passed into cracking reactor 6 wherein a portion of the ethane is converted into ethylene and hydrogen and a smaller portion is converted into carbon monoxide, carbon dioxide, water vapor, and higher boiling hydrocarbons. The oxidation of a portion of the hydrocarbon feed in reactor 6 serves to supply the heat needed to attain the desired reaction temperature, which may be as high as 2000° F., and to compensate for the endothermic heat of reaction. The contact time in reactor 6, expressed in terms of gas hourly space velocity, which is defined by the volume of the reaction zone, usually lies within the range of from 5000 to 40,000. The pressure usually lies within the range of from about 0.5 to about 10 atmospheres.

The effluent from cracking reactor 6 passes through line 7 containing valve 9 and into methanizing reactor 8. This reactor 8 contains a bed of catalyst prepared by reducing hematite with hydrogen at a temperature of 950° F. The volume of catalyst in reactor 8 and the charge rate thereto are such that the gas hourly space velocity lies within the range of from about 10 to about 1000 and preferably from about 100 to 200, based on the hydrogen plus carbon monoxide. The temperature maintained therein is from about 500° F. to about 900° F. and preferably from about 600 to about 800° F. The lower temperatures are satisfactory when the feed contains hydrogen in an amount greater than that needed to convert the carbon monoxide in the feed to methane. The pressure maintained in reactor 8 is such that a substantial portion of the reactants are in the vapor phase. Since there is a volume contraction due to the reaction, pressure is favorable, hence, the reaction often is conducted at pressures of from about 100 to about 300 pounds per square inch.

The primary reaction that appears to take place in methanizing reactor 8 is $$3H_2 + CO \rightarrow CH_4 + H_2O$$

However, heavier hydrocarbons may also be produced by a similar reaction. Even when there is a substantial deficiency of hydrogen in the feed to the methanizing zone, it has been noted that practically complete removal of the carbon monoxide is obtained due, probably, to the following additional reaction, which my catalyst also promotes:

$$CO + H_2O \rightarrow CO_2 + H_2$$

Thus it can be seen that the amount of carbon monoxide in the feed need not be exactly balanced by a stoichiometric amount of hydrogen in order to obtain substantially complete removal of the former. The above two equations may be added together to give a resultant equation as follows:

$$2H_2 + 2CO \rightarrow CH_4 + CO_2$$

It will be noted from this equation that only one molecule of hydrogen is required to remove each molecule of carbon monoxide. If the methanizer feed contains less than this amount of hydrogen, extraneous hydrogen or even water may be added to compensate for this deficiency.

Typical analyses of the charge to and the effluent from the methanizing step are shown below:

| Component, Mol Per cent | Charge | Effluent[1] |
|---|---|---|
| $H_2$ | 36 | 0 |
| $CH_4$ | 7 | 33 |
| $C_2H_4$ | 28 | 47 |
| $C_2H_6$ | 12 | 20 |
| $CO$ | 13 | 0 |
| $CO_2$ | 4 | 0 |

[1] After removal of $CO_2$.

Thus it can be seen that the effluent is free from carbon monoxide and that the concentration of ethylene in the effluent is at a much more attractive level.

The effluent from methanizing reactor 8 passes through line 10 containing valve 11 and into the bottom of $CO_2$ scrubber 12 wherein it flows upwardly and countercurrently to a descending stream of triethanolamine or similar material which is a selective solvent for $CO_2$. The lean triethanolamine enters scrubber 12 through line 13 containing valve 14 and the rich solution leaves the scrubber through line 15 containing valve 16. If desired, the effluent from the methanizing step may be subjected to the action of sodium carbonate or similar material or to the action of bauxite at elevated temperatures, to remove the small amount of aldehydes, acids, etc., produced in the cracking and methanizing steps. The $CO_2$ free hydrocarbons from scrubber 12 leave through line 17 containing valve 18 and pass into fractionator 19. Hydrogen and methane are removed overhead from this fractionator through line 20 containing valve 21. The hydrogen- and methane-free hydrocarbons are withdrawn from fractionator 19 through line 22 containing valve 23 and are passed into fractionator 24. Ethylene is removed overhead from fractionator 24 through line 25 containing valve 26 and is sent to storage or conversion processes. Ethane is removed from fractionator 24 through line 27 containing valve 28 and is recycled back to cracking reactor 6. A small amount of hydrocarbons of higher molecular weight than ethane are contained in the stream that is recycled from the bottom of fractionator 24 to the cracking reactor. These higher boiling hydrocarbons usually are converted to lower boiling hydrocarbons in the cracking step, but, if they tend to accumulate in the recycle stream of ethane, a portion of said stream may be withdrawn through line 30 containing valve 31 and sent to storage or fractionation.

It is to be understood that instead of separating the various hydrocarbons in the products by fractionation, the same result may be accomplished by absorption or a combination of absorption and distillation. In some applications, it is not essential that the ethylene be substantially free from other hydrocarbons. In such instances, the fractionation steps shown in the drawing can be omitted and the stream of hydrocarbons from the $CO_2$ scrubber can be utilized directly in some other conversion process such as the alkylation of benzene with ethylene.

For purposes of simplification, equipment such as pumps, condensers, reflux accumulators, and the like have been omitted from the drawing but such items are to be used wherever needed.

I claim as my invention:

1. A process for preparing a hydrocarbon fraction relatively free from carbon monoxide which comprises contacting a mixture comprising carbon monoxide, hydrogen, and hydrocarbons, including olefins, at a temperature of from about 500° F. to about 900° F., a gas hourly space velocity of from about 10 to about 1000, based on the hydrogen plus carbon monoxide, and a pressure such that a substantial proportion of the reactants are in the vapor phase, with a catalyst prepared by reducing iron oxide at a temperature of from about 800° F. to about 1200° F. to thereby substantially completely hydrogenate the carbon monoxide without effecting substantial hydrogenation of the olefins.

2. A process for preparing a hydrocarbon fraction relatively free from carbon monoxide which comprises contacting a mixture comprising carbon monoxide, hydrogen, and hydrocarbons, including olefins, at a temperature of from about 500° F. to about 900° F., a gas hourly space velocity of from about 10 to about 1000, based on the hydrogen plus carbon monoxide, and a pressure such that a substantial proportion of the reactants are in the vapor phase, with a catalyst prepared by reducing iron oxide ore at a temperature of from about 800° F. to about 1200° F. to thereby substantially completely hydrogenate the carbon monoxide without effecting substantial hydrogenation of the olefins.

3. A process which comprises contacting, at a temperature of from about 500° F. to about 900° F. and a pressure such that a substantial portion of the reactants are in the vapor phase, a mixture containing an olefinic hydrocarbon and carbon monoxide with hydrogen in the presence of a catalyst prepared by reducing iron oxide at a temperature of from about 800° F. to about 1200° F. to thereby substantially completely hydrogenate the carbon monoxide without effecting substantial hydrogenation of the olefinic hydrocarbon.

4. The process of claim 3 further characterized in that the catalyst contains from about 0.1 to about 2.0 weight per cent of potassa.

5. A process for preparing a hydrocarbon fraction relatively free from carbon monoxide which comprises contacting a mixture comprising carbon monoxide, hydrogen, and hydrocarbons, including olefins, at a temperature of from about 500° F. to about 900° F., a gas hourly space velocity of from about 10 to about 1000, based on hydrogen plus carbon monoxide, and a pressure such that a substantial portion of the reactants are in the vapor phase, with a catalyst prepared by reducing a mineral of the group selected from hematite, specular hematite, limonite, goethite, martite, and magnetite at a temperature of from about 800° F. to about 1200° F. to thereby substantially completely hydrogenate the carbon monoxide without effecting substantial hydrogenation of the olefins.

6. The process of claim 5 further characterized in that the catalyst contains from about 0.1 to about 2.0 weight per cent of potassa.

CHARLES H. WATKINS.

REFERENCES CITED

The following references are of record in the file of this patent:

UNITED STATES PATENTS

| Number | Name | Date |
|---|---|---|
| 1,597,796 | James | Aug. 31, 1926 |
| 1,643,663 | Klatte | Sept. 27, 1927 |
| 2,074,311 | Moore | Mar. 16, 1937 |
| 2,327,066 | Roelen | Aug. 17, 1943 |
| 2,338,805 | Dreyfus | Jan. 11, 1944 |
| 2,437,600 | Gresham et al. | Mar. 9, 1948 |
| 2,440,109 | Moore | Apr. 20, 1948 |
| 2,443,673 | Atwell | June 22, 1948 |

OTHER REFERENCES

Ser. No. 397,105, Klein (A. P. C.), April 27, 1943.